United States Patent
Bent et al.

(10) Patent No.: US 6,374,231 B1
(45) Date of Patent: *Apr. 16, 2002

(54) MONEY FUND BANKING SYSTEM

(76) Inventors: Bruce Bent, 18 Heights Rd., Manhasset, NY (US) 11030; Bruce Bent, II, 99 Jane St., Apt. 11B, New York, NY (US) 10014

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,340

(22) Filed: Oct. 21, 1998

(51) Int. Cl.[7] .............................................. G06F 17/60
(52) U.S. Cl. .......................... 705/40; 705/36; 705/37; 705/38
(58) Field of Search .............................. 705/36, 37, 38, 705/40

(56) References Cited

U.S. PATENT DOCUMENTS

| | | | |
|---|---|---|---|
| 4,232,367 A | * 11/1980 | Youden et al. ................ 705/38 |
| 4,346,442 A | 8/1982 | Musmanno |
| 4,376,978 A | 3/1983 | Musmanno |
| 4,597,046 A | 6/1986 | Musmanno |
| 4,674,044 A | 6/1987 | Kalmus |
| 4,694,397 A | 9/1987 | Grant |
| 4,700,297 A | 10/1987 | Hagel |
| 4,751,640 A | * 6/1988 | Lucas et al. ................ 705/36 |
| 4,774,663 A | 9/1988 | Musmanno |
| 4,953,085 A | 8/1990 | Atkins |
| 5,126,936 A | 6/1992 | Champion |
| 5,206,803 A | 4/1993 | Vitagliano |
| 5,235,507 A | 8/1993 | Sackler |
| 5,262,942 A | * 11/1993 | Earle ......................... 705/37 |
| 5,270,922 A | 12/1993 | Higgins |
| 5,297,032 A | 3/1994 | Trojan |
| 5,671,363 A | 9/1997 | Christofich |
| 5,689,650 A | * 11/1997 | McClelland et al. ........ 705/36 |
| 5,710,889 A | 1/1998 | Clark |
| 5,765,144 A | 6/1998 | Larche |
| 5,774,880 A | 6/1998 | Ginsberg |
| 5,781,654 A | 7/1998 | Carney |
| 5,806,049 A | 9/1998 | Petruzzi |
| 5,812,987 A | 9/1998 | Luskin |
| 5,826,243 A | 10/1998 | Musmanno |
| 5,878,258 A | 3/1999 | Pizi |
| 5,890,141 A | 3/1999 | Carney |

(List continued on next page.)

FOREIGN PATENT DOCUMENTS

| | | | | |
|---|---|---|---|---|
| JP | 10049590 | * | 2/1998 | ........... G06F/17/60 |
| WO | 95/23379 | * | 8/1995 | ........... G06F/17/00 |

OTHER PUBLICATIONS

Britt, Phil; "Struggling with sweep accounts", America's Community Banker, v6, n12, p18–23, Dec. 1997.*

News article; "Regulators Support Demand Deposit Bill", Regulatory Compliance Watch–Mar. 9, 1998; p 1; vol. 9, No. 10.*

*Primary Examiner*—Vincent Millin
*Assistant Examiner*—Jagdish N Patel
(74) *Attorney, Agent, or Firm*—Hopgood, Calimafde, Judlowe & Mondolino, LLP

(57) ABSTRACT

Providing interest to clients' deposited finds without the legal limitation on the number of demand withdrawals from deposit accounts is accomplished by an administration system that keeps all of the records for the clients' deposits and withdrawals, calculates the total of the deposits and withdrawals for all clients, and uses the calculation to determine whether funds are deposited to or withdrawn from a single deposit account in which all clients' deposit funds are kept. Clients can make unlimited withdrawals, such as by check, credit card, debit card, or electronic transfer, through the administrator. By placing the administrator as the holder of a single account, legal exemptions to the limitation on earning interest in demand accounts is facilitated.

19 Claims, 2 Drawing Sheets

U.S. PATENT DOCUMENTS

| | | |
|---|---|---|
| 5,893,078 A | 4/1999 | Paulson |
| 5,905,974 A | 5/1999 | Fraser |
| 5,940,809 A | 8/1999 | Musmanno |
| 5,941,996 A | 8/1999 | Smith |
| 5,950,175 A | 9/1999 | Austin |
| 5,978,779 A | 11/1999 | Stein |
| 6,014,642 A | 1/2000 | El-Kadi |
| 6,016,482 A | 1/2000 | Molinari |
| 6,026,438 A | 2/2000 | Piazza |
| 6,044,371 A | 3/2000 | Person |
| 6,047,324 A | 4/2000 | Ford |
| 6,105,005 A | 8/2000 | Fuhrer |
| 6,108,641 A | 8/2000 | Kenna |
| 6,131,810 A | 10/2000 | Weiss |
| 6,154,770 A | 11/2000 | Kostakos |

* cited by examiner

MONEY FUND BANKING SYSTEM

BACKGROUND OF THE INVENTION

1. Field of the Invention

The novel system is in the field of account transaction processing and provides an administered money fund banking system that is integrated with an insured deposit account.

2. State of the Art

The Federal Deposit Insurance Corporation ("FDIC") is a federal governmental entity that provides insurance for deposits in most banks and savings institutions in the United States. Bank deposits are insured by the FDIC's Bank Insurance Fund ("BIF") and savings institutions' deposits are insured by the FDIC's Savings Association Insurance Fund ("SAIF"). The rules governing insurance of deposits of institutions insured by the BIF and the SAIF are the same. The FDIC bases insurance coverage on the concept of ownership rights and capacities: finds held in different ownership categories are insured separately from each other, and funds of the same ownership but held in different accounts are subsumed under the same insurance coverage. The amount of insurance covered provided to depositors of each institution insured by BIF and SAIF is the same: $100,000.00 to the owner(s) of the funds in the account(s), including principal and interest.

Title 12, Part 329, of the Code of Federal Regulations ("CFR") specifies that "no bank shall, directly or indirectly, by any device whatsoever, pay interest on any demand deposit."(12 C.F.R. § 329.2.) A "deposit" is any money put into a savings account, a checking account, or time account such as a certificate of deposit. A "demand" account is one from which the owner of the account can demand that funds be drawn and paid elsewhere, either to another account (of the same or a different owner) or to a third party. These payments are typically made via a bank draft or check, or a credit or debit card. A account different than a demand account is an account where all or a fixed amount of the principal must be maintained in the account for a period of time to achieve the particular benefits offered by that account. As stated in this section of the CFR, a "demand deposit" includes any deposit in account under which terms the depositor is authorized to make, during any month or statement cycle of at least four weeks, more than six transfers by means of a preauthorized or automatic transfer of telephone (including data transmission) agreement, order or instruction, which transfers are made to another account of the depositor at the same bank, to the bank itself, or to a third party provided that such an account will be deemed a demand deposit if more than three of the six authorized transfers are authorized to be made by check, draft, debit card or similar order made by the depositor. (12 C.F.R. § 329.1(b)(3).) On the other hand, withdrawals from a deposit account are not deemed to be included within the six transfers permitted for a nondemand account when the withdrawals are made by mail, messenger, telephone (via check mailed to the depositor), automated teller machine, or in person. In essence, unless the funds of a deposit are held in a NOW account (18 U.S.C. 1832(a)), an account in which a depositor has the ability to make at least six transfers will be deemed a demand account and no interest will be payable on the funds therein. Therefore, owners of demand accounts are denied interest on their funds.

SUMMARY OF THE INVENTION

In light of this regulatory scheme, it would be beneficial to provide depositors of demand accounts with interest from the funds on deposit while simultaneously providing unlimited (or at least six) transfers of the funds therein. For example, it would be beneficial to provide such depositors with the ability to deposit funds into the demand account from various sources, and to make payments from the demand account via different instruments, without limitation as to the number of transfers, and still earn interest on the funds in the clients' accounts.

To accomplish these and other objectives, this invention provides a system for managing a plurality of accounts for multiple clients by administering at a banking institution a single insured deposit account in which all of the funds for the insured deposit accounts are held, providing a database having client information for each client's account, administering clients' deposits to and withdrawals from each of their accounts, authorizing whether funds in a particular clients account can be used for each payment requested from that client's account, determining as the net transaction of the sum of the insured money market account deposits and withdrawals from the plurality of insured money market accounts on a regular periodic basis, using the determination of the net transaction to deposit funds to or withdraw funds from the single insured deposit account, distributing interest earned on the single deposit account to each of the clients in proportion to their portion of funds in the deposit account, and updating the database for each client's deposits and authorized demand payments.

DESCRIPTION OF SPECIFIC EMBODIMENTS OF THE INVENTION

The present system will be described with reference to an administrator, which can be brokerage, a bank, or another entity with which clients can institute financial transactions such as deposits and demand payments. The administrator appears to each client as if it were, in part, a bank, by accepting deposits for the client's account and by authorizing (and then making) payments demanded by the client from his account. The funds for all of the clients are pooled into a single fund that is maintained as an insured deposit account at a licensed banking institution. This system is preferably implemented in combination with a brokerage account so that the client can centralize all of his financial needs: deposit of funds; demand orders for payment (checking); payment authorization by debit card; securities transactions; retirement plans; and the like.

The following description of the hardware and software is for exemplification of a working system; other architectures can be fashioned to make the systems and perform the methods claimed herein. The system has been implemented on a mainframe computer (e.g., an IBM Application Starterpac 3000 model A20, which is capable of processing 63 million instructions per second) with an operating system such as OS/390 and MVS/ESA running a relational database (e.g., DB2 type database). The programing languages are IBM COBOL, CICS languages along with IBM's CSP screen generation language. For such a system, memory requirements are satisfied with 768 Gigabytes of storage (preferably, e.g., 1024G with a disk storage and recovery system, such as RAID). Communications generally are run on a mixed SNA and TCP/IP network. Communications with a local area network via a local control unit can be implemented using a token ring. Connection to an internal network has been made via an IBM open systems adapter (OSA) running TCP/IP, which allows File Transfer Protocol (ftp) via a firewall. Bisynchronous and synchronous file transfer protocols are made through various dial-up media. Terminal Access runs on an Ethernet local area network, using an SAA gateway, and other gateways (e.g., Cytrix and Netsoft) for remote access. Additionally, several lease lines for several applications and terminal access are supported by the system.

Figure 1:
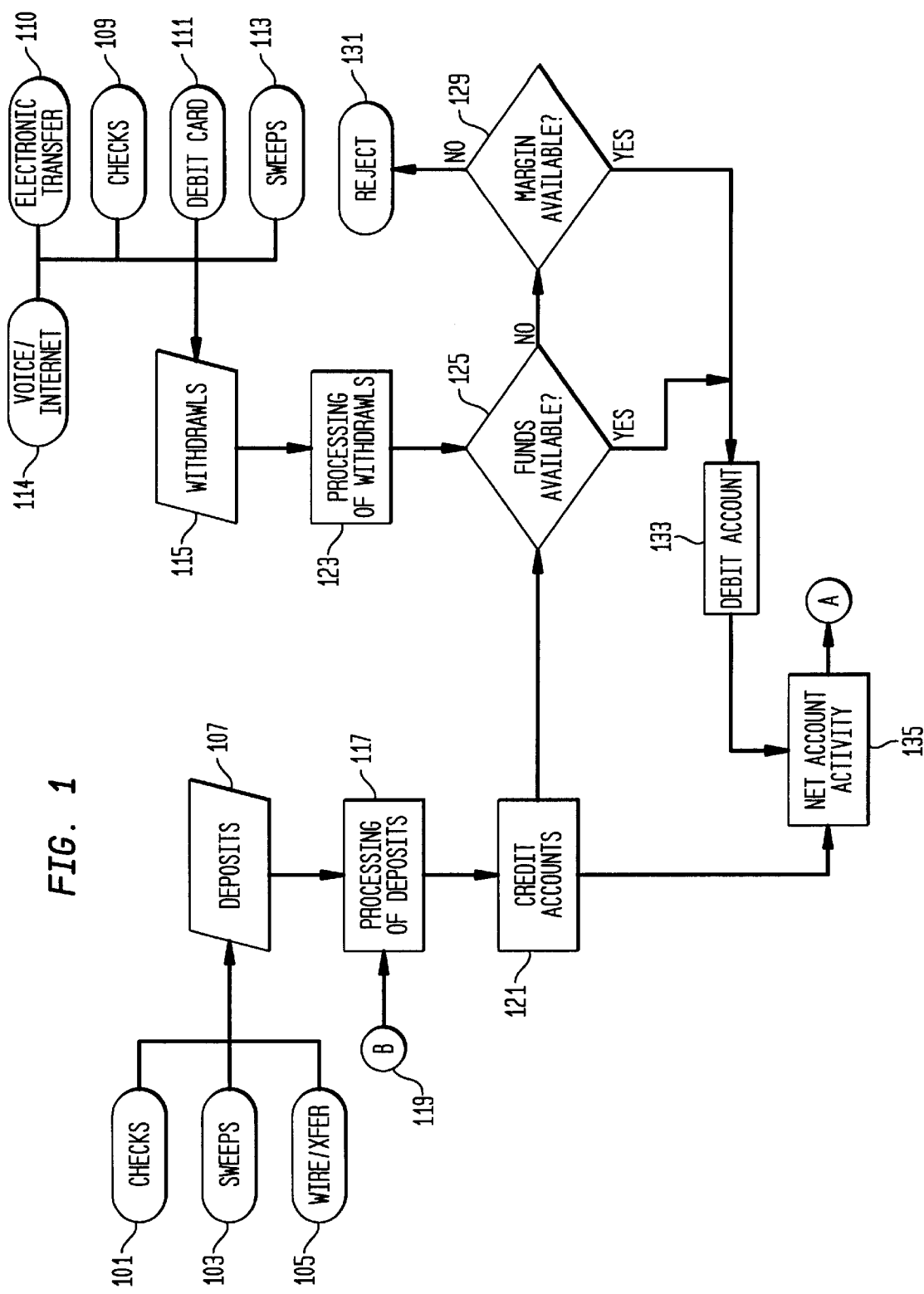
FIGS. 1 and 2 show flow chart depicting certain processing steps the system follows at the administrator's end.
Figure 2:
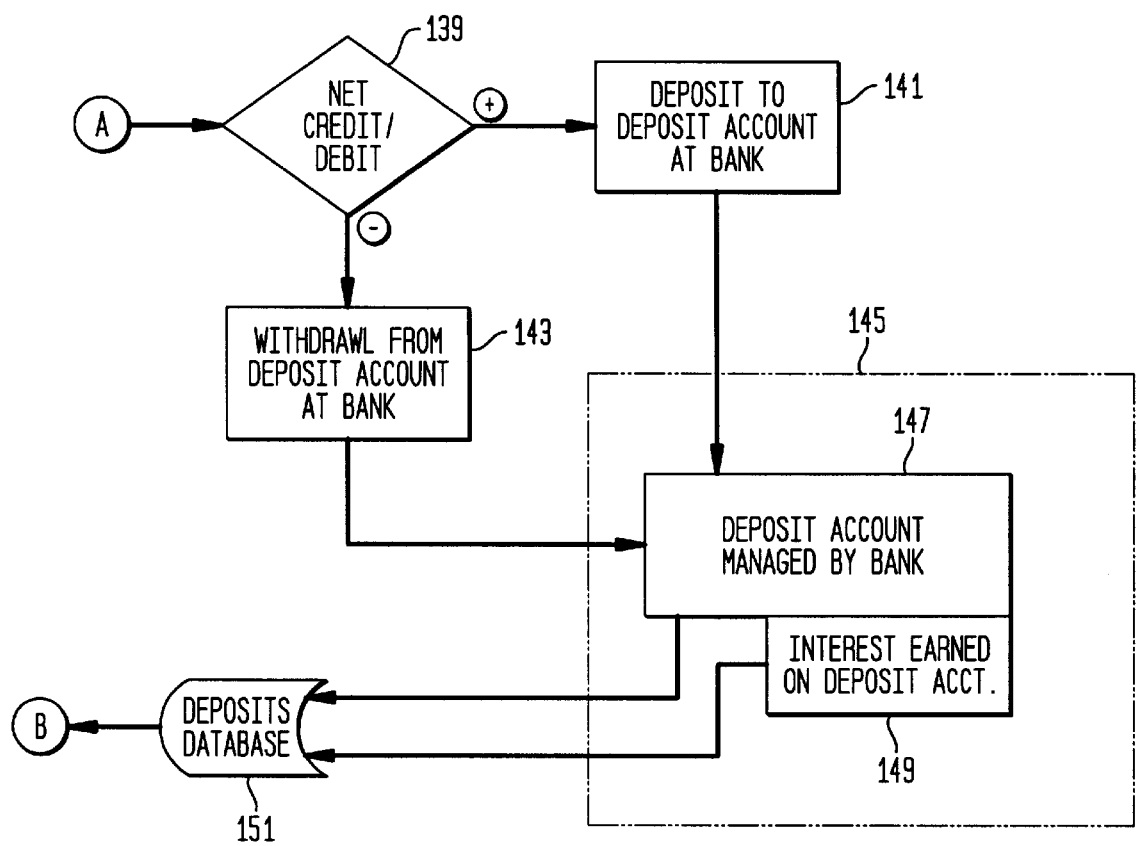

FIGS. 1 and 2 show flowchart depicting certain processing steps the system follows at the administrator's end. It should be understood that the order in which these steps are performed may be varied without impairing the achievement of the aforementioned objects of the invention. The client adds funds ("deposits") to his account typically via check 101, sweeps 103 of funds from another account (e.g., a broker/dealer account), and/or by wire and other transfers 105 (such as fed funds wire and direct deposit via ACH) for investment in an FDIC insured money fund account. These funds are deposited in a deposit account with a bank on behalf of the participant. The amount of each of the deposited items is summed 107 to determine the deposits for each client, preferably on a regular periodic basis (e.g., daily) or instantaneously. On the other side, the administrator provides the participant with access to his funds by various methods: payments can be made from funds drawn from the account by check 109; electronic funds transfer 110; debit card 111 authorized by the client (and ACH debit); sweeps of funds 113 to another account (e.g., a broker/dealer account); and electronic and voice access 114 (e.g., internet on-line banking, banking by telephone) for automated transaction requests; and transactions authorized by mail. A "sweep" is a an automated movement of funds between a client's other account (e.g., a broker/dealer account) and his insured deposits account (in either direction). The registration on the other account and the insured deposit account are identical; there is a one for one relationship between the brokerage account and the insured deposits account.

The sum of the deposits is processed 117 with information 119 from a database (described later) that stores information about the demand account for each client. Each client's account is credited 121 with the sum of the deposits for that particular account, which may amount to zero on a particular day. Similarly, the sum and of withdrawals are processed 123 to determine what should be debited from the account, which may also amount to zero on a particular day. The deposits and withdrawals for each account during a given period are compared 125 to determine whether sufficient finds are present in the client's account, including the added funds, to pay the withdrawals requested by the client. In other words, processing determines which client accounts to credit or debit for the various transactions (sweep, checks, debit cards, ACH, etc.) received each business period (e.g., daily). These transactions can be received from one or more sources, such as brokerage firms (sweep transactions), banks (deposits made by wire trasfer, checks presented for payment, ACH, debit card transactions), the mail (check deposits, redemption requests), and telephone requests. "Telephone" requests can be performed by voice, conversing with an operator/broker or a voice response system, or via a touch-tone phone using a menu system, or electronically via the internet using email or the World Wide Web (e.g., a web page, preferrably secure, onto which users can log in and conduct on-line banking). The final step in the day's processing is to determine the net credit or debit for the deposit account at the bank; the net activity represents all transactions that were processed that day for all insured deposit accounts.

If sufficient funds are not available for drafts and other orders to pay, the requested withdrawal(s) are denied and the client's total account information is again accessed to determine 129 if the client has sufficiently available margin to cover the requested withdrawal(s) (other than, preferably, sweep transactions). If insufficient funds and insufficient margin are available, then the requested withdrawal is denied 131. The client's margin typically is determined by the value of the clients funds held in the client's broker/dealer (securities) account. When sufficient funds are available in the insured deposit account, or a sufficient margin is available in the client's securities account with the administrator, then a debit is made 133 to the client's insured deposit account in the amount of the withdrawal(s) allowed (based on the funds and margin then available) and the processed and authorized withdrawals are paid as directed by the client. The sum of the processed credits 121 and the processed debits 133 are determined for all of the administrator's clients to arrive at a net account activity determination 135. The order in which credits and debits are processed depends upon a subjective protocol and/or operation of law. For example, transactions that are pre-approved (such as authorized debit card transactions, and sweeps) are likely to be processed when received; transactions requiring authorization or acceptance by a third party (such as a bank draft or check) may be credited to the insured deposit account but not available for withdrawal until authorization or acceptance.

The net account activity determination 135 is then used to determine a net credit/debit 139 for the single deposit account held at the bank that contains all of the funds of all of the administrator's clients; the deposit account must be debited or credited to account for all clients' deposits and withdrawals during the period. If the net result is positive (e.g., amount of deposits processed minus amount of authorized withdrawals processed is positive), then the calculated amount is deposited 141 to the single account. If the net result is negative (e.g., amount of deposits processed minus amount of withdrawals processed is negative), then the calculated amount is withdrawn 143 from the single deposit account. An individual insured money market account is maintained for each client on a administrator's database. Each transaction received for an account is individually posted against the client's account on the database. Funds are exchanged between the appropriate parties to cover transactions (broker for sweep transactions; bank for debit cards, checks, ACH, etc.). These transactions are posted and settled prior to any activity taking place in the insured deposit account at the bank. In a preferred embodiment, the last movement of funds on each day is the net movement of funds (credit or debit) that takes place in the deposit account at the bank. The sum of the account balances (principle plus interest) for clients participating in the this system equals the balance in the deposit account at the bank.

The information from the calculations of a net credit/debit 139 are used to implement the processing of the actual deposit or withdrawal (141, 143) to the deposit account, and that information (and funds, if required) is sent to the bank 145 to execute the actual deposit or withdrawal required. If the deposit account is to be credited, then deposits are transferred to the bank and credited to the deposit account 147; conversely, if funds are to be withdrawn from the deposit account, a bulk withdrawal is made from the deposit account to account for the withdrawals that have been authorized from the clients' accounts; in essence, the withdrawal from the deposit account need only make up the difference between the authorized withdrawals and the deposits. If the client wishes to use his excess margin buying power for overdraft protection, the broker/dealer transmits the client's available margin line to the administrator regularly (preferably daily). The available margin line will be taken into consideration when checks, debit card, and other draft and order to pay transactions (e.g., ACH debits, on-line banking withdrawals, and other electronic payments) are processed. If the client's margin line is used to process a check or debit card transaction, a loan will be created and transmitted to the broker dealer by the administrator. Preferably, the broker dealer maintains the margin loan on his system and will pay the administrator for all funds advanced. Using this methodology for margin accounts, there is no effect on the deposit account at the bank.

The bank pays interest 149 on the single deposit account to the administrator. Based on the amount of each client's funds in the deposit account as a function of the total amount in the deposit account, the administrator determines the interest amount (if any) each client is owed (based also on the period during which the interest was determined on a particular account balance). Because all of the clients' finds are in a single account under the name of the administrator, the administrator earns the interest and distributes the interest earned to each of the clients. Further, the limitation on transfers from a interest-bearing account is inapplicable to the clients because their funds are held by the administrator in a demand account and interest for the client is determined only on that portion of those finds maintained in the bank's deposit account. Preferably, if necessary, the administrator makes any withdrawals from the deposit account in person.

After the deposit account has been credited or debited in accordance with the determination for that period of the sum of the deposits and withdrawals from clients, and the interest earned on the single deposit account, this information is transferred back to the administrator's deposits database 151. This database includes information about each client (such as name, address, and other important or desired demographic and tax information about each client's account), as well as financial information regarding the client's holdings on deposit in the bank (i.e., that client's portion of the single deposit account) and holdings with the administrator (e.g., securities and the like).

As seen, the administrator maintains several relationships that provide services for the insured money market accounts. These various entities provide transaction data that is transmitted to the administrator and processed. Preferably, the administrator is its own transfer agent and provides a shareholder accounting system. Preferably, accounts may be opened through a broker dealer that is a client of the administrator, or directly with an application and check.

The administrator may allow a client with an account under the present system to access his funds by check or with a debit card; in such a case, the administrator has arranged for these services and maintains these relationships which are separate and apart from the deposit account. Banks that provide check and card services will transmit a file each day to the administrator that contains the checks presented for payment and/or the debit card transactions. The transactions that apply to his account under the present system are out sorted and processed against the administrator's database. The administrator will settle with each bank for the transactions that were processed.

The administrator may accept direct deposit of payroll, social secerity, or pensions for accounts. The clients' accounts are updated as these files are received and processed. The administrator may also accepts ACH debit transactions, which are initiated by the client's bank or a third party at the client's request.

The administrator may also provide the participants with automated bill paying services. Participants preferably provided with a touchtone bill paying system and/or an internet on line banking service. Bill payment requests may be downloaded each morning for processing.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A method for managing a plurality of demand accounts for multiple clients whose funds are held at a banking institution in a single insured money market deposit account, comprising:

providing a database having client information for each account;

administering clients' deposits to and withdrawals from each of their demand accounts;

authorizing or rejecting the use of funds in a particular client's demand account for each demand payment requested from that client's account;

determining the net transaction aggregated across all said demand account deposits and withdrawals on a regular periodic basis;

using the determination of the net transaction to deposit funds to or withdraw funds from said single insured money market deposit account;

distributing interest paid on said single money market deposit account to said clients' demand accounts; and updating the database for each client's deposit and authorized demand payment.

2. The method of claim 1, wherein withdrawals are made by at least one method selected from the group consisting of drafts (checks), credit card, debit card, sweeps, electronic transfer, and combinations thereof.

3. The method of claim 1, wherein deposits are made by at least one method selected from the group consisting of drafts (checks), sweeps, electronic transfers, and combinations thereof.

4. A system for managing a plurality of demand accounts for multiple clients whose funds are held at a banking institution in a single insured money market deposit account, comprising:

a database having client information for each demand account;

a device for administering clients' deposits to and withdrawals from each of their demand accounts;

a device for authorizing or rejecting the use of funds in a particular client's demand account to be used for each demand payment requested to be paid drawn on funds from that client's demand account;

a device for determining the net transaction aggregated across all said demand account deposits and withdrawals on a regular periodic basis;

a comparison device for determining from the net transaction whether to deposit funds to or withdraw funds from said single insured money market deposit account;

a device for distributing interested earned on said money market deposit account among the clients; and a device for updating the database for each client's; deposits and authorized demand payments.

5. The system of claim 4, wherein withdrawals are in the form of at least one type selected from the group consisting of drafts (checks), credit card, debit card, sweeps, electronic transfers, and combinations thereof.

6. The system of claim 1, wherein deposits are in the form of least one type selected from the group consisting of drafts (checks), sweeps, electronic transfers, and combinations thereof.

7. A data processing system for implementing and managing plural client transaction accounts providing a return to each of said clients, by aggregating the assets associated with said client transaction accounts for deposit in a corresponding insured deposit account and providing a return on assets held therein, said system comprising:
   a. transaction input processor for receiving transactions, including deposits and/or withdrawals to one or more of said plural client accounts;
   b. account computation processor responsive to said transactions and capable of calculating a corresponding balance for each said client transaction account, including determining and crediting said transaction account with a return associated with said balance of each said client accounts;
   c. memory module storing data on said plural client accounts, wherein account balances are periodically updated to include said corresponding return to each of said client accounts; and
   d. said computation processor assessing the aggregate activity of said plural client transaction accounts for a respective period, and calculating an asset adjustment to said insured deposit account, to permit adjustment of the amount in said insured deposit account by a method consistent with maintaining the insured and interest bearing status of said insured deposit account.

8. The system of claim 7, wherein said transaction input processor accesses a client account by one or more transaction methods selected from the group consisting of check, withdrawal, credit card, electronic fund transfer, debit card, sweep, internet communication, voice activation, and banking by telephone.

9. The system of claim 8, wherein said transaction input processor accesses said account by three or more of said methods.

10. The system of claim 8, wherein said transaction input processor accesses said account by five or more of said methods.

11. The system of claim 7, wherein said computational processor responds to withdrawal transactions for a client's account by assessing fund availability and based, in whole or in part, thereon approving or denying said withdrawal transaction.

12. The system of claim 11, wherein said computational processor applies margin requirements to said client's account in assessing a withdrawal transaction therefrom.

13. The system of claim 7, wherein the return for the insured deposit account is used to determine the returns for the plural client accounts.

14. The system of claim 8, wherein transactions further include automated bill paying.

15. The system of claim 7, wherein periodic deposits to a client's account include one or more of the following: direct automated payroll; direct social security; automated sweep from another of that client's accounts; electronic funds transfer; and manual check deposit.

16. A data processing method for tracking and managing a plurality of client transaction accounts and providing a return to each of said accounts, the funds associated with said accounts aggregated for deposit in a corresponding insured deposit account providing a return on assets held therein, comprising the steps of:
   a. creating one or more account memory ledgers and storing therein select data for one or more of said plurality of client transaction accounts;
   b. storing in said memory ledgers account data including a current or periodic account balance as well as an identification of an account owner or beneficiary;
   c. tracking deposits to and withdrawals from each of said client transaction accounts and adjusting the balance for each in response to such transactions;
   d. creating an insured deposit account in which funds from a plurality of said client transaction accounts are deposited, and managing said insured deposit account by assessing the aggregate activity of said plural client transaction accounts for a respective period and calculating an asset adjustment to said insured deposit account to permit adjustment of the amount in said insured deposit account by a method consistent with maintaining the insured and return bearing status of said insured deposit account; and
   e. calculating an aggregate transactional value for said client accounts having funds held in said insured deposit account over a selected period of time and determining a net asset adjustment for said insured account, to be implemented in a manner consistent with retaining its status as insured and providing a return on the assets.

17. The method of claim 16, wherein said transactions into or out of a client's transaction account include sweeps into or sweeps out of said account.

18. The method of claim 16, further comprising calculating a corresponding return for each client transaction account having funds maintained in said insured account based on the return on the assets held in the insured deposit account.

19. The method of claim 18, wherein withdrawal transactions resulting in a negative net balance for a client's account trigger a margin approval process for such account.

* * * * *